May 22, 1934.   F. FLEXON   1,959,417
MEANS FOR CIRCULATING MOLTEN GLASS
Filed Oct. 25, 1932   2 Sheets-Sheet 1
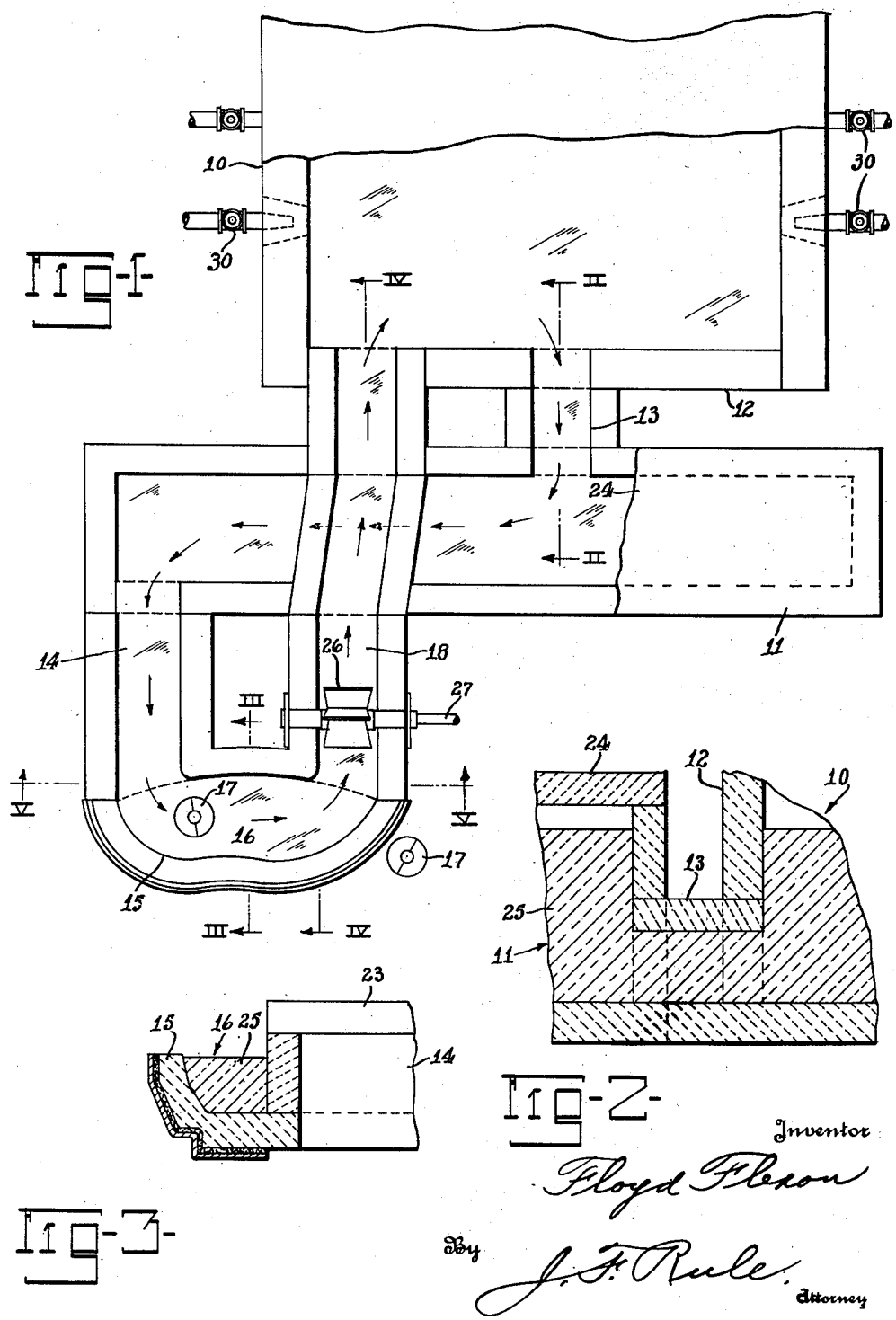

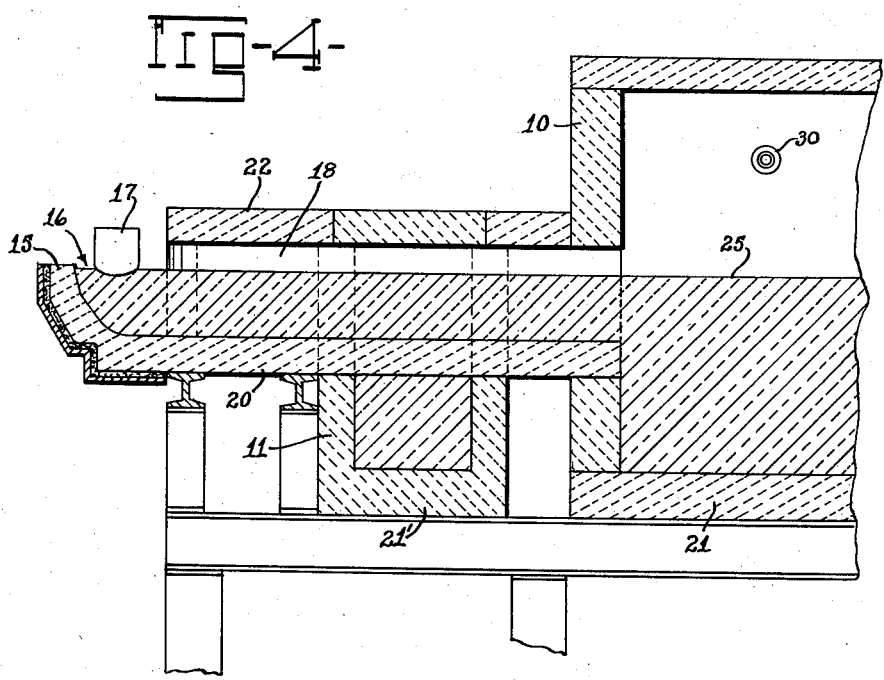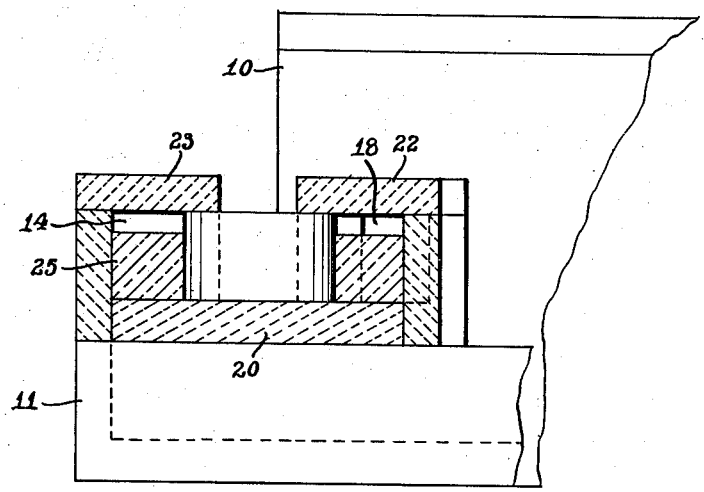

Patented May 22, 1934

1,959,417

UNITED STATES PATENT OFFICE 1,959,417

MEANS FOR CIRCULATING MOLTEN GLASS

Floyd Flexon, Alton, Ill., assignor to Owens-Illinois Glass Company, a corporation of Ohio Application October 25, 1932, Serial No. 639,392

6 Claims. (Cl. 49—56)

My invention relates to means associated with a glass melting furnace, for causing a flow of molten glass from the furnace to a gathering area where a portion of the glass is withdrawn, as, for example, by suction gathering molds, and means for returning the ungathered portion of flowing glass to the furnace.

An object of the invention is to provide practical means for maintaining a circulation of glass from the refining tank or compartment of a furnace past a gathering area and returning to the melting tank or compartment that portion of the glass which is not withdrawn for use at the gathering area.

The invention is adapted for use with suction gathering machines generally. In the particular form illustrated, it may be used, for example, with an Owens type machine in which an annular series of molds rotate about a vertical axis, the molds being brought in succession over the gathering area from which they gather charges of glass by suction. The molds when they contact with the glass at the gathering area chill portions of the glass in the pool or supply body from which they gather. Also, when molds are lifted from the pool and the glass severed, the cut-off portions of glass which fall back into the pool are chilled by exposure to the air and by contact with the mold and cut-off knife. The glass at the gathering area is also chilled by exposure to the outside air.

In order that the glass which is gathered into the molds shall be at the proper temperature and in suitable condition, it is necessary to maintain a constant circulation or movement of the glass past the gathering area to carry away the chilled portions of glass and maintain a fresh supply at the gathering point. Heretofore, it has been the general practice to maintain such movement of the glass by means of a continuously rotating gathering pot separate from the main furnace. Such rotary pots are not economical as a large amount of fuel is required to reheat the chilled portions of glass and maintain a proper temperature of glass at the gathering point. There are also other drawbacks and undesirable features connected with the use of such revolving pots, as, for example, the cost of installation and maintenance, the amount of room required, the difficulty of fully melting and reconditioning the chilled portions of glass before they are again brought to the gathering area, and maintaining the required uniform temperature at the gathering point.

Attempts have heretofore been made to overcome the above difficulties by the use of a stationary forehearth or channel through which glass flows from the main tank past the gathering area and back into the tank. One objection to such constructions is the difficulty of maintaining an effective circulation of the glass past the gathering area and a complete remelting and conditioning of the chilled portions of glass before it is again brought to the gathering area. The glass which flows from the gathering point back into the furnace has a tendency to take a short circuit to the outlet channel and back again to the gathering point, before it has been completely remelted and assimilated by the main body of glass.

An object of the present invention is to overcome the above difficulties and for this purpose I provide an arrangement comprising an outlet channel through which the glass flows from the refining tank to the forehearth or gathering point, and a return channel extending from the forehearth to the melting tank. I also provide means in the return channel for maintaining an adequate circulation of the glass.

Other objects of the invention will appear hereinafter.

In the accompanying drawings:

Figure 1 is a partly diagrammatic plan view of a construction embodying the present invention, including the melting tank, refining tank, and a channel through which the glass is circulated, a portion of the tank covers being removed to more clearly show the construction.

Fig. 2 is a section at the line II—II on Fig. 1, showing the usual throat connecting the melting and refining tanks.

Fig. 3 is a vertical section through the forehearth at the line III—III on Fig. 1.

Fig. 4 is a vertical section through the return channel, taken at the line IV—IV on Fig. 1.

Fig. 5 is a vertical section at the line V—V on Fig. 1.

Referring to the drawings, the furnace comprises a melting tank or compartment 10 which may be of usual construction, in which the raw materials are melted to produce the glass, and a refining tank or compartment 11 separated from the melting tank by a bridge wall 12 but communicating therewith through the usual throat or channel 13. The glass from the refining tank flows through an outlet channel 14 to a forehearth or gathering tank 15 which presents an exposed gathering area 16. Suction gathering molds 17 which may be arranged in an annular series on a horizontally rotating mold carriage (not shown), are brought in succession over the gathering area and are lowered into contact with the glass which is drawn by suction into the mold cavities and then severed in a well known manner. That portion of the glass which flows through the forehearth without entering the molds is returned to the melting tank 10 through a return channel 18.

By reference to Figs. 4 and 5, it will be seen that a floor 20 is provided for the forehearth 15 and the channels 14 and 18, the same floor serving for both channels and forehearth. This floor is located at a considerably higher level than the floor 21' of the refining tank and the floor 21 of the melting tank. It will also be observed that the return channel 18 extends across the refining chamber 11, the side walls of the refining tank being cut away to accommodate the side walls of said return channel. As shown, the side walls of the refining tank and the channels 14 and 18 all have their upper surfaces at the same level. The roof or cover 22 of the channel 18, the cover 23 of the channel 14 and the cover 24 of the refining tank are all at the same level and united to form in effect a single cover for said channels and refining tank. It will be seen that with the construction above described, the channel 18 extends through the refining chamber, said channel having its floor below the level of the glass 25 in the refining chamber.

The glass flows as usual from the melting tank through the throat 13 into the refining tank and from thence, as indicated by the arrows, flows through the outlet channel 14 to the exposed gathering area 16 in the forehearth 15. The molds 17 travel over said area in the same general direction in which the glass is flowing through the forehearth. The movement of the molds through the glass tends to maintain a circulation of the glass past the gathering area. It is found in practice that with certain types of machines and molds the circulation thus maintained is sufficient for practical purposes without auxiliary means for circulating the glass. With other types of machines and molds it is necessary to provide supplemental means operating separately from the molds for circulating the glass. I have herein (Fig. 1) shown such circulating means as comprising a paddle wheel including a series of blades or paddles 26 mounted on a continuously rotating shaft 27. The shaft 27 is journaled in or above the side walls of the return channel 18, with the paddle wheel over the glass and the blades dipping therein and operating positively to maintain a continuous movement of glass from the forehearth or gathering area back to the melting tank. It will be observed that with this construction the chilled portions of glass, instead of being returned to the refining tank before being reheated and reconditioned, must first pass through the melting tank. It will also be noted that the glass thus returned to the melting tank is discharged therein at or near the surface level of the glass in the melting tank so that it is brought within the influence of the burners 30 which direct their flames over the surface of the glass batch in the melting tank for melting the raw materials. Evidently the glass thus returned will be fully remelted and reconditioned before it can again return to the gathering area. In this connection, it will also be noted that the glass entering the refining tank must flow through the throat 13 near the floor level of the tanks and is, therefore, drawn from the completely melted glass that has settled to the level of said throat.

Modifications may be resorted to within the spirit and scope of my invention.

What I claim is:

1. A glass furnace comprising a melting tank, a refining tank, a throat connecting said tanks, and means for directing a flow of glass including an outlet channel extending from the refining tank, a forehearth presenting an exposed area of glass, and a return channel extending from the forehearth across the refining tank to the melting tank.

2. A glass furnace comprising a melting tank, a refining tank, a throat connecting said tanks, means for directing a flow of glass including an outlet channel extending from the refining tank, a forehearth and a return channel extending from the forehearth across the refining tank to the melting tank, and means in said return channel for propelling the glass toward the melting tank.

3. The combination of a glass melting tank, a forehearth or gathering tank presenting an exposed gathering area of glass, and means for directing and maintaining a circulation of glass from the melting tank past said gathering area and back to the main tank, said means being constructed and arranged to cause the glass in its passage from the gathering area back to the tank to flow above and across the glass flowing from the melting tank to the gathering area.

4. The combination of a glass melting tank, a forehearth or gathering tank presenting an exposed gathering area of glass, and means for directing and maintaining a circulation of glass from the melting tank past said gathering area and back to the main tank, said circulating means including a return channel extending from the gathering area to the melting tank, said channel extending over and across the path of the glass flowing from the melting tank to the gathering area.

5. The combination of a tank to contain molten glass, a forehearth presenting an exposed area of molten glass, means for directing a flow of glass from the melting tank to the gathering area, and means for directing a flow of glass from the gathering area back to the melting tank in a path overlying and extending across that of the glass in its passage to said gathering area.

6. The combination of a glass melting tank, a forehearth, a refining tank interposed between the melting tank and forehearth, means for directing a flow of glass from the refining tank to the forehearth, and means for directing a flow of glass from the forehearth across the refining tank and into the melting tank.

FLOYD FLEXON.